United States Patent Office 3,463,634
Patented Aug. 26, 1969

3,463,634
CARBON REDUCTION PROCESS
Harley A. Wilhelm and James K. McClusky, Ames, Iowa, assignors to the United States of America as represented by the United States Atomic Energy Commission
No Drawing. Filed Aug. 9, 1968, Ser. No. 751,339
Int. Cl. C22b 61/04, 55/00
U.S. Cl. 75—84        10 Claims

ABSTRACT OF THE DISCLOSURE

A process for reducing uranium or vanadium oxides to high-purity metal by heating under reduced pressure a mixture of the metal oxide and carbon to form an electrically conductive intermediate. This intermediate is then heated by self-induction under reduced pressure in a ceramic crucible until reduced to the metal.

CONTRACTUAL ORIGIN OF THE INVENTION

The invention described herein was made in the course of, or under, a contract with the United States Atomic Energy Commission.

BACKGROUND OF THE INVENTION

This invention relates to a method for reducing metal oxides to high-purity metals. More specifically this invention relates to a carbothermic process for the reduction of uranium oxides and vanadium oxides to a metal containing very small amounts of carbon and other impurities.

A large-scale process for the reduction of uranium dioxide is based on reduction of the oxide by carbon at high temperature and low pressure. The process consists of firing uranium dioxide-carbon pellets in a vacuum furnace at about 2200° C. to form a product containing equimolar weights of uranium and uranium carbide.

The product, which forms a biscuit, is immersed in water where the uranium carbide is preferentially attacked, with the evolution of hydrocarbons of low molecular weight and the formation of a suspension of uranium dioxide, leaving a metal sponge of uranium. A dilute solution of nitric acid is used to clean the sponge which is then vacuum-dried and converted into ingots by vacuum-melting or into slugs by hot-pressing. The yield is about 33% of uranium metal containing about 240 p.p.m. carbon. It can be seen that the process is reasonably complex and hence costly and results in only a fair yield of relatively pure metal product.

More recent attempts have been made to develop carbothermic reduction methods to obtain pure metals but these have generally resulted in relatively high degrees of carbon contamination. One of these processes consisted of heating a mixture of uranium dioxide and carbon to 2200° C. under a vacuum in an yttria crucible using a graphite cylinder as the heater. However, the resulting metal contained a considerable amount of carbon impurity.

Although graphite is the most desirable susceptor material for the system used, it has been found to vaporize under the high temperatures and vacuum conditions necessary to make the carbon reduction reaction proceed, thus contributing to the carbon contamination of the metal. Other materials have been tried, such as uranium dioxide liners to protect the crucible and zirconia coatings on the crucibles, but neither was successful.

SUMMARY OF THE INVENTION

We have invented a carbothermic process for the reduction of uranium and vanadium oxides to highly pure metals which eliminates many of the disadvantages associated with the prior art processes. We accomplish this by making use of the electrically conductive properties of certain metal oxycarbide compounds of impure metallic products which permit them to be heated by self-induction. Self-induction as used herein refers to the property of the material which causes it to be self-heating when placed in conventional induction heating equipment. This self-inducting property permits complete reduction of the oxycarbide or metallic products in the absence of any carbon or graphite container which, under the required reaction conditions, would normally cause contamination of the metal product by carbon. The process of this invention comprises mixing the metal oxide and carbon together to form a homogeneous mixture. The mixture is then partially reduced by heating under reduced pressure to form the electrically conductive product which is cooled under nitrogen-free conditions to room temperature. The cooled product is then transferred to a ceramic crucible and heated by self-induction under reduced pressure until the reduction reaction has gone to completion. The crucible is cooled slowly to room temperature and the pure metal removed therefrom.

It is therefore one object of this invention to provide a process for producing metal having a high degree of purity.

It is another object of this invention to provide a process for producing metal having a low carbon content by the carbothermic reduction of metal oxides.

Finally, it is an object of this invention to provide a relatively simple method of reducing uranium and vanadium oxides to metals having a high degree of purity.

DESCRIPTION OF THE PREFERRED EMBODIMENT

These and other objects of the invention can be attained by adding a stoichiometric amount of carbon to the uranium or vanadium oxide and mixing them thoroughly to form a homogeneous mixture. The resulting mixture is then placed in a crucible and the pressure reduced to about $1 \times 10^{-4}$ mm. Hg. The crucible is then heated to 1550 to 1950° C. for uranium oxide and 1300 to about 1650° C. for vanadium oxide. This heating causes a partial reduction reaction to take place, which results in an increase in pressure due to the evolution of product gases. The temperature is maintained until the pressure drops which is an indication that the partial reduction reaction is adequate and that the electrically conducting product is formed. This product is then cooled to room temperature either under a vacuum or in an inert atmosphere to prevent pickup of nitrogen from the air.

Once cooled, this partially reduced product is transferred to a ceramic crucible having a ceramic lid and insulation. The product is then heated by induction under reduced pressure of about $1 \times 10^{-4}$ mm. Hg to a temperature of about 2200° C. for uranium oxycarbide and about 1950° C. for the impure metallic vanadium product. This heating causes a further reduction reaction to take place, which results in an increase in pressure due to the evolution of product gases. This temperature is maintained until the pressure is reduced to a sufficiently low value to indicate essential completion of the reduction reaction and formation of the uranium or vanadium metal. The crucible is allowed to cool slowly and the pure metal is then ready for any further processing.

The product yields achieved by this process on a laboratory scale average between 85 to 90%. The uranium metal is found to contain about 100 p.p.m. carbon, 40 p.p.m. nitrogen and about 100 p.p.m. oxygen. The vanadium metal after electron beam melting was found to contain 660 p.p.m. carbon, 150 p.p.m. oxygen and less than 20 p.p.m. of nitrogen.

The preferred uranium oxide is $U_3O_8$, although uranium dioxide ($UO_2$) is also quite satisfactory. The $U_3O_8$ is preferred because it has greater packing density and, therefore, contains more uranium per unit volume of charge than uranium dioxide. $U_3O_8$ is also cheaper than the dioxide, since it is readily obtainable simply by heating uranium trioxide in air to 800° C. The uranium trioxide must be reduced with hydrogen in order to obtain the dioxide, making the dioxide more expensive. About 7.2 moles of carbon are required to reduce 1 mole of $U_3O_8$ and about 2.0 moles of carbon for 1 mole of the dioxide.

The vanadium oxide which may be used is either $V_2O_5$ or $V_2O_3$, the only difference in the composition of the charge being in the amount of carbon necessary to complete the reaction. Thus, 1 mole of $V_2O_5$ requires about 4.2 moles of carbon and 1 mole of $V_2O_3$ requires about 3.0 moles of carbon to complete reduction.

The particle sizes of the metal oxide and carbon powders are not especially important. It is important that they be mixed thoroughly. It was found that this could best be attained by mixing in a ball mill. Ceramic stones may also be placed in the ball mill with the charge to aid in mixing.

When $U_3O_8$ and $V_2O_5$ are heated, it is important that a carefully controlled heating procedure be employed or that the crucible have a lid which contains small openings or breathing holes. This lid is important, since it acts to prevent loss of the charge by "blow out" due to rapid gas evolution during the initial heating and reduction of these oxides. This lid is not necessary when $UO_2$ or $V_2O_3$ are being reduced. Graphite is the choice of material for the crucible and lid because of the conditions and reactants involved.

The temperatures for preparing the partially reduced electrically conducting products for heating by self-induction depend upon the metal oxide being reduced. Thus, the preferred temperature for the uranium oxides is 1800 to 1850° C., although temperatures of 1550 to 1950° C. are satisfactory. Temperatures lower than this will cause the reaction to go very slowly, while higher temperatures may cause some melting and result in some undesirable carbide formation. It is very important that the $U_3O_8$ and $V_2O_5$ charges, if contained in an uncovered crucible be heated very slowly up to the temperature where the initial reduction reaction occurs in order to prevent any violent eruption due to the rapid evolution of gas which may occur with more rapid heating. The preferred temperature range for partial reduction of vanadium oxide to the impure metallic vanadium is 1300 to 1600° C.

Heating of the metal oxide and carbon mixtures and the intermediate electrically conducting product is done under reduced pressure in order to facilitate carrying the reactions to the desired degree of completion. In general, it was found that an initial pressure of about $1\times10^{-4}$ mm. Hg before heating indicated satisfactory vacuum conditions for both reduction reactions. Because of the quantities of gases evolved during the heating steps by these reactions, it is impracticable to maintain this pressure; so a large increase of pressure in the system will result during the reduction reaction. For the final reduction to purified liquid metal, a pressure drop to about $1\times10^{-4}$ mm. Hg is indicative of an essentially completed reduction. Thus, the preferred reaction temperature, once attained, is to be maintained until a pressure of this order is achieved, indicating essential completion of the reaction, before cooling of the product should begin.

The desired composition of the intermediate electrically conducting products fall within a range corresponding roughly to the Formula $MO_xC_x$ where M is uranium or vanadium and $x$ is equal to 0.1 to 1.0. Since the products of interest are electrically conductive, they can be heated by self-induction without the necessity of graphite or other inductive susceptor materials. This then permits the heating of the metal intermediate product to a high enough temperature, in the absence of a graphite crucible, to permit an essentially complete reduction to the desired high-purity metal.

Once the reaction is completed, the crucible is allowed to cool to room temperature. It is important that this cooling step be done under essentially nitrogen-free conditions, either under reduced pressure or under an inert atmosphere, to prevent contamination of the intermediate product by nitrogen. As an alternative to this cooling, transfer of the hot intermediate product to the ceramic crucible might take place under an inert atmosphere.

When the intermediate product has cooled to room temperature, it can be removed from the crucible without fear of nitrogen contamination and placed into a ceramic crucible. The uranium oxycarbide can be moved as it comes from the graphite, although care should be taken to prevent the formation of any cracks which might affect conductivity and thus heating by self-induction. It is preferred that the vanadium intermediate be ground and pressed into a suitable shape before insertion into the ceramic crucible. This is necessary to improve the density of the material and to improve the coupling of the charge with the induction coil.

The preferred crucible material for uranium oxycarbide reduction is uranium dioxide or urania. Although some other material may also work, the urania will withstand the temperatures and reactants and any contamination of the product from the crucible would be of the urania and not a foreign material. The preferred material for containing the vanadium intermediate during its reaction to form liquid metal is $Y_2O_3$ or yttria, although zirconia mixtures or some rare earth oxides might also work. The crucible may be made by any method known to those skilled in the the art, such as slip casting or jolt packing.

Once the intermediate product has been placed in the ceramic crucible, the pressure is reduced to at least $1\times10^{-4}$ mm. Hg before the heating starts. A temperature of from 2150 to 2250° C. is preferred for reduction of the uranium oxycarbide. A lower temperature will result in a decreased reaction rate and may not complete the reaction in a reasonable period of time. Higher temperatures may result in a reaction between the uranium metal and the crucible material which would result in crucible failure. The preferred temperature for the vanadium intermediate product reaction was found to be 1950 to 2000° C.

Once the reaction temperature is reached, it is maintained until the reaction is essentially completed. Completion of the reaction may be assumed when the pressure drops to $1\times10^{-4}$ mm. Hg or less. It is preferred that the metals and particularly the uranium metal cool very slowly, since this tends to let any carbides which may form from the melt float to the top of the metal where they may then be easily removed from the metal by mechanical means.

The following examples are given as illustrations of the process of this invention and are not to be taken as limiting the scope or extent of the invention.

Example I 200 grams of $U_3O_8$ and 20.53 grams of carbon in the form of high-purity graphite powder were mixed in a ball mill containing ceramic stones for 3 to 4 hours. After the charge was mixed, it was placed in a graphite crucible. When the crucible was adequately filled, 3 or 4 holes were formed through the depth of the charge with a 1/16-inch-diameter wire to help in permitting the product gas to escape from the charge as the reaction is carried out; a screw-type graphite lid with breather holes was placed on the charged crucible.

The crucible was then placed in a vacuum induction furnace, the pressure was reduced to about $1 \times 10^{-4}$ mm. Hg and heating was commenced. The induction heating coil was positioned so that the hottest zone of the coil was at the top of the charge. The top of the charge was heated slowly at about 20° per minute until 1200° C. was attained. The coil was then lowered until the entire charge was at about this temperature. Once the gas pressure began to drop, the entire charge was heated at an accelerated rate until 1860° C. was attained. This heating caused the gas pressure to increase to $1 \times 10^{-1}$ mm. Hg and the temperature was maintained until a noticeable decrease in system pressure occurred, indicating essential completion of the reaction and formation of the oxycarbide. After cooling under vacuum, the resulting oxycarbide was transferred to a $UO_2$ crucible, taking care not to crack the product. The crucible was packed in a quartz beaker, using $UO_2$ powder as insulation. A $UO_2$ lid with a chimney was placed on the crucible and $UO_2$ powder packed around it for further insulation. This charge was then placed in a vacuum induction furnace and evacuated to $7 \times 10^{-5}$ mm. Hg. The oxycarbide was then heated by self-induction to 2250° C. and this temperature maintained until the system pressure decreased to $9 \times 10^{-5}$ mm. Hg. After cooling, analysis revealed the uranium metal to contain 100 p.p.m. carbon and 100 p.p.m. oxygen. The yield of metal on this charge size was 82%.

Example II 200 grams of $UO_2$ and 18.41 grams of carbon as high-purity graphite powder were intimately mixed as described in Example I. After the charge was thoroughly mixed, it was placed in a graphite crucible and breather holes were placed in the charge. The system was evacuated to $1 \times 10^{-4}$ mm. Hg and the entire charge was heated to about 1800° C. which resulted in an increase in system pressure to $5 \times 10^{-1}$ mm. Hg. This temperature was maintained until system pressure decreased to $1.5 \times 10^{-2}$ mm. Hg. The oxycarbide was cooled under the vacuum to room temperature and then transferred to a $UO_2$ crucible as described in Example I. The system was evacuated to $1 \times 10^{-4}$ mm. Hg and the oxycarbide heated by self-induction to 2150° C. and maintained at that temperature until system pressure decreased to $3 \times 10^{-5}$ mm. Hg, when it was allowed to cool. Analytical results of the cooled uranium metal showed the presence of 80 p.p.m. carbon and 100 p.p.m. oxygen. The over-all yield was 80%.

Example III 80.0 grams of $V_2O_5$ were mixed with 22.18 grams of carbon by the method described in Example I, except that the mixing time was from 8–10 hours. After the charge was thoroughly mixed, it was packed in a graphite crucible with a graphite lid as described in Example I.

The crucible was placed in a vacuum induction furnace and the pressure was reduced to $1 \times 10^{-4}$ mm. Hg. Heating was commenced by positioning the induction coil so that the hottest zone of the coil was at the top of the charge and the charge was heated slowly at about 20° per minute until the reaction began at about 650° C. When this occurred, the coil was lowered in steps until the entire charge exceeded this temperature, at which time the entire charge was heated to 1400° C. This temperature was maintained until the pressure dropped to $5 \times 10^{-2}$ mm. Hg, at which time heating ceased and the charge was allowed to cool. The resulting sintered intermediate vanadium product was crushed, seived through a 100-mesh screen and the resulting material pressed into the shape of a right cylinder.

The resulting shape was placed into a $Y_2O_3$ crucible which was packed in a quartz beaker using $Y_2O_3$ powder as insulation. A $Y_2O_3$ lid completed the assembly. The charge and crucible were placed in a vacuum induction furnace and heating by self-induction of the vanadium intermediate commenced when the pressure was decreased to $5 \times 10^{-5}$ mm. Hg. The charge was heated to 1950° C., during which time the pressure increased to $8 \times 10^{-1}$ mm. Hg. When the pressure dropped to $1 \times 10^{-4}$ mm. Hg, the reaction was assumed to be completed and the furnace was allowed to cool. The resulting vanadium metal was then electron beam melted. An analysis of a sample revealed it to contain 600 p.p.m. carbon, 600 p.p.m. oxygen and 30 p.p.m. nitrogen with an over-all product yield of 85%.

Example IV

A charge was prepared by mixing 80 grams of $V_2O_3$ with 19.23 grams of carbon. The mixing was accomplished as previously described. The charge was placed in a graphite crucible without a lid. After placing the charge and crucible in a vacuum induction furnace, heating was commenced after a vacuum of $1 \times 10^{-4}$ mm. Hg, was established. A temperature of 1500° C. was maintained until the pressure, which had risen to $4 \times 10^{-1}$ mm. Hg, dropped to $7.5 \times 10^{-2}$ mm. Hg, at which time the furnace was allowed to cool.

The vanadium intermediate was prepared as described in Example III and placed into the $Y_2O_3$ crucible assembly and heated to 1930° C. Analysis of the vanadium metal after electron beam melting revealed it to contain 800 p.p.m. carbon, 300 p.p.m. oxygen and 40 p.p.m. nitrogen. The yield was 86%.

It will be understood that the invention is not to be limited to the details given herein but that it may be modified within the scope of the appended claims.

The embodiments of the invention in which an exclusive property or privilege is claimed are defined as follows:

1. A method of producing pure uranium or vanadium metals by reduction of their metal oxides comprising: mixing said metal oxide with an amount of carbon sufficient to completely reduce said oxide to the metal, reducing the pressure on said mixture to $1 \times 10^{-4}$ mm. Hg, heating said mixture to a temperature sufficient to cause a partial reduction of the mixture, said reduction causing an evolution of gas, maintaining said temperature until said gas evolution decreases, indicating formation of an intermediate product having a composition corresponding roughly to the formula $MO_xC_x$ where M is uranium or vanadium and $x=0.1$ to 1.0; cooling said compound under essentially nitrogen-free conditions; placing said cooled product in a ceramic crucible, reducing the pressure on said product to $1 \times 10^{-4}$ mm. Hg; heating said product by self-induction to a temperature sufficient to cause essentially complete reduction of said product, said reduction causing an increase in gas evolution; maintaining said temperature until said gas evolution decreases as metal is formed; and cooling said metal.

2. The method of claim 1 wherein the metal oxide is a member of the group consisting of $U_3O_8$, $UO_2$, $V_2O_3$ and $V_2O_5$.

3. The method of claim 2 wherein the metal oxide is $U_3O_8$, the pressure on the $U_3O_8$ and carbon mixture is reduced to $1 \times 10^{-4}$ mm. Hg; said mixture is heated to a temperature of 1550 to 1950° C. and said temperature is maintained until said pressure decreases sufficiently to indicate adequate formation of a uranium intermediate product; the ceramic crucible is $UO_2$; the pressure on the product is reduced to $1 \times 10^{-4}$ mm. Hg; said product is heated to a temperature of 2150 to 2250° C. and said temperature is maintained until said pressure decreases to about $1 \times 10^{-4}$ mm. Hg indicating the uranium metal is formed.

4. The method of claim 3 wherein 1 mole of $U_3O_8$ is mixed wtih about 7.2 moles of carbon; the pressure on said mixture is reduced to $1 \times 10^{-4}$ mm. Hg; heating said mixture to 1860° C., causing a reaction with gas evolution; maintaining said temperature until said gas evolution subsides sufficiently to indicate formation of said uranium intermediate product; cooling said product under a vacuum; transferring said cooled product to a $UO_2$ crucible; reducing the pressure on said product to about $1 \times 10^{-4}$ mm. Hg; heating said product by self-induction to 2250° C., causing further gas evolution, maintaining said temperature until gas evolution subsides and said pressure is decreased to about $1 \times 10^{-4}$ mm. Hg indicating formation of said uranium metal; and cooling said metal.

5. The method of claim 2 wherein the metal oxide is $UO_2$; the pressure on the $UO_2$ and carbon mixture is reduced to $1 \times 10^{-4}$ mm. Hg; said mixture is heated to a temperature of 1550 to 1950° C. and said temperature is maintained until said gas evolution subsides sufficiently to indicate formation of uranium intermediate product; the ceramic crucible is $UO_2$; the pressure on the product is reduced to $1 \times 10^{-4}$ mm. Hg; said product is heated to a temperature of 2150 to 2250° C. and said temperature is maintained until said gas evolution subsides and pressure decreases to about $1 \times 10^{-4}$ mm. Hg indicating uranium metal was formed.

6. The method of claim 5 wherein 1 mole of $UO_2$ is mixed with about 2 moles of carbon; the pressure on said mixture is reduced to $1 \times 10^{-4}$ mm. Hg; heating said mixture to 1800° C., causing a reaction with gas evolution; maintaining said temperature until said gas evolution subsides and the pressure is decreased to about $15 \times 10^{-3}$ mm. Hg indicating formation of said uranium intermediate product; cooling said product under a vacuum; transferring said cooled product to a $UO_2$ crucible; reducing the pressure to about $1 \times 10^{-4}$ mm. Hg; heating said product by self-induction to 2150° C., causing further gas evolution; maintaining said temperature until gas evolution subsides and said pressure is decreased to about $3 \times 10^{-5}$ mm. Hg indicating formation of said uranium metal; and cooling said metal.

7. The method of claim 2 wherein the metal oxide is $V_2O_5$; the pressure on the $V_2O_5$ and carbon mixture is reduced to about $1 \times 10^{-4}$ mm. Hg; said mixture is heated to a temperature of 1300 to 1600° C.; said temperature is maintained until said gas evolution decreases sufficiently to indicate adequate formation of the vanadium intermediate product; the ceramic crucible is $Y_2O_3$; the pressure on the intermediate product is reduced to $1 \times 10^{-4}$ mm. Hg; said product is heated to a temperature of 1900 to 2000° C.; and said temperature is maintained until the pressure decreases to about $1 \times 10^{-4}$ mm. Hg indicating that vanadium metal is formed.

8. The method of claim 7 wherein 1 mole of $V_2O_5$ is mixed with about 4.2 moles of carbon; reducing the pressure on said mixture to about $1 \times 10^{-4}$ mm. Hg; heating said mixture to roughly 1400° C., causing a reaction with gas evolution resulting in an increase in said pressure; maintaining said temperature until said pressure decreases to $50 \times 10^{-3}$ mm. Hg indicating formation of said vanadium intermediate product; cooling said product; transferring said cooled product to a $Y_2O_3$ crucible; decreasing said pressure to about $5 \times 10^{-5}$ mm. Hg; heating said product by self-induction ito 1950° C., causing further reaction with gas evolution resulting in an increase in said pressure; maintaining said temperature until said pressure decreases to about $1 \times 10^{-4}$ mm. Hg indicating formation of said vanadium metal; and cooling said metal.

9. The method of claim 2 wherein the metal oxide is $V_2O_3$; the pressure on the $V_2O_3$ and carbon mixture is reduced to about $1 \times 10^{-4}$ mm. Hg; said mixture is heated to a temperature of 1300 to 1600° C.; said temperature is maintained until said pressure decreases to about $7.5 \times 10^{-2}$ mm. Hg indicating adequate formation of said vanadium intermediate product; the ceramic crucible is $Y_2O_3$; the pressure on the product is reduced to about $1 \times 10^{-4}$ mm. Hg; said product is heated to a temperature of 1900 to 2000° C.; said temperature is maintained until said pressure decreases to about $1 \times 10^{-4}$ mm. Hg indicating that vanadium metal is formed.

10. The method of claim 9 wherein 1 mole of $V_2O_3$ is mixed with 3 moles of carbon; reducing the pressure of said mixture to about $1 \times 10^{-4}$ mm. Hg; heating said mixture to about 1500° C., causing gas evolution and an increase in said pressure; maintaining said temperature until said pressure decreases to about $75 \times 10^{-3}$ mm. Hg indicating formation of said vanadium intermediate product; cooling said product; transferring said cooled product to a $Y_2O_3$ crucible; reducing said pressure to $1 \times 10^{-4}$ mm. Hg; heating said product by self-induction to 1930° C., causing an increase in said pressure; maintaining said temperature until said pressure decreases to about $1 \times 10^{-4}$ mm. Hg indicating formation of said vanadium metal; and cooling said metal.

References Cited
UNITED STATES PATENTS

| | | | |
|---|---|---|---|
| 2,850,378 | 9/1958 | Cooper | 75—84 |
| 2,905,552 | 9/1959 | Holden et al. | 75—84.1 |
| 3,288,593 | 11/1966 | Smith et al. | 75—84 |
| 3,288,594 | 11/1966 | Smith | 75—84.1 X |

CARL D. QUARFORTH, Primary Examiner

M. J. SCOLNICK, Assistant Examiner

U.S. Cl. X.R.

75—84.1